US008866993B2

(12) United States Patent
Yaguchi et al.

(10) Patent No.: US 8,866,993 B2
(45) Date of Patent: Oct. 21, 2014

(54) LIQUID CRYSTAL DISPLAY DEVICE

(75) Inventors: Tomio Yaguchi, Sagamihara (JP); Youhei Iwai, Chosei (JP); Hideyuki Ohsaka, Mobara (JP)

(73) Assignee: Japan Display Inc., Tokyo (JP)

( * ) Notice: Subject to any disclaimer, the term of this patent is extended or adjusted under 35 U.S.C. 154(b) by 36 days.

(21) Appl. No.: 13/352,413

(22) Filed: Jan. 18, 2012

(65) Prior Publication Data

US 2012/0188484 A1 Jul. 26, 2012

(30) Foreign Application Priority Data

Jan. 25, 2011 (JP) .................................. 2011-012434

(51) Int. Cl.
- *G02F 1/133* (2006.01)
- *G02F 1/1333* (2006.01)
- *F21V 8/00* (2006.01)
- *G02F 1/1335* (2006.01)

(52) U.S. Cl.
CPC .... G02F 1/133308 (2013.01); *G02F 1/133615* (2013.01); *G02F 2001/133317* (2013.01); G02B 6/0081 (2013.01); G02B 6/0088 (2013.01)
USPC ............................................. 349/62; 349/60

(58) Field of Classification Search
USPC .......................................................... 349/62
See application file for complete search history.

(56) References Cited

U.S. PATENT DOCUMENTS

| 2005/0194884 A1* | 9/2005 | Liu ............................... 313/483 |
| 2007/0115691 A1* | 5/2007 | Yu ................................ 362/632 |
| 2008/0299398 A1* | 12/2008 | Hata et al. ..................... 428/412 |
| 2009/0009046 A1* | 1/2009 | Oh et al. ............................ 313/1 |
| 2009/0115936 A1* | 5/2009 | Takeuchi et al. ................ 349/64 |
| 2009/0237596 A1* | 9/2009 | Park et al. ....................... 349/69 |
| 2010/0066938 A1* | 3/2010 | Lee ................................ 349/58 |
| 2010/0085696 A1* | 4/2010 | Kim et al. ................. 361/679.21 |
| 2010/0134716 A1* | 6/2010 | Hamada .......................... 349/62 |

FOREIGN PATENT DOCUMENTS

JP 2005-274632 10/2005

* cited by examiner

*Primary Examiner* — Bumsuk Won
*Assistant Examiner* — Edmond Lau
(74) *Attorney, Agent, or Firm* — Ulmer & Berne LLP

(57) ABSTRACT

In a liquid crystal display device having a display region defined by an area where a TFT substrate and an opposing substrate are superposed on each other, the present invention realizes a structure for avoiding breakage of a mechanically weak terminal section where the TFT substrate only extends. The terminal section where the TFT substrate only extends is mounted on a resin mold. Inside the resin mold, partition walls are formed to accommodate LEDs. By providing two partition walls in a pair at least in a center portion, an external pressure exerted on the center portion of the resin mold is distributed between the two partition walls and a maximum stress exerted on the terminal section of the TFT substrate is reduced.

2 Claims, 6 Drawing Sheets

LIQUID CRYSTAL DISPLAY DEVICE

CLAIM OF PRIORITY

The present application claims priority from Japanese Patent Application JP 2011-012434 filed on Jan. 25, 2011, the content of which is hereby incorporated by reference into this application.

FIELD OF THE INVENTION

The present invention relates to a liquid crystal display device and particularly to improving the mechanical strength of a thinner liquid crystal display device for use in a mobile phone or the like.

BACKGROUND OF THE INVENTION

In a liquid crystal display (LCD) device, a display region is formed such that a TFT substrate over which pixel electrodes and thin-film transistors (TFTs), inter alia, are formed in a matrix and an opposing substrate over which color filters, inter alia, are formed in positions corresponding to the pixel electrodes in the TFT substrate are placed facing each other and liquid crystals are sandwiched between the TFT substrate and the opposing substrate. An image is produced by controlling light transmissibility through liquid crystal molecules pixel by pixel.

A miniature display of a mobile phone or the like is strongly required to be made thinner, which thus results in a strong demand for making a liquid crystal display device thinner. Therefore, thinning a liquid crystal display panel is pursued in addition to thinning a backlight and decreasing the thickness of a metal frame forming a casing.

A liquid crystal display panel has a structure such that a liquid crystal layer is sandwiched between the TFT substrate and the opposing substrate and a lower polarizing plate is attached to the underside of the TFT substrate, while an upper polarizing plate is attached to the upper surface of the opposing substrate, and this area defines the display region. The TFT substrate is formed larger than the opposing substrate and, in a terminal section where the opposing substrate does not extend over the TFT substrate, an IC driver is installed and a flexible wiring board is connected.

The terminal section of the TFT substrate is weak in mechanical strength, because it is made of a single glass plate. In order to decrease the thickness of the liquid crystal display panel, the liquid crystal display panel is ground to decrease its thickness after the panel is finished. In the manufacturing process of the liquid crystal display panel, for example, if the TFT substrate and the opposing substrate are made so that their glass plates each have a thickness of 0.5 mm, the TFT substrate and the opposing substrate, together, will be about 1 mm thick.

For such liquid crystal display panel, both the TFT substrate and the opposing substrate are thinned to be about 0.2 mm thick, respectively, by grinding the outer surfaces of the TFT substrate and the opposing substrate. In this case, an area where the TFT substrate and the opposing substrate are superposed on each other has a thickness of about 0.4 mm, but the terminal section where the TFT substrate only extends just has a thickness of about 0.2 mm. Further, the area where the TFT substrate and the opposing substrate are superposed on each other defines the display region and the polarizing plates with a thickness of about 0.13 mm, respectively, are attached to the substrates. Hence, when comparing the mechanical strength of the terminal section of the TFT substrate with that of the area where the TFT substrate and the opposing substrate are superposed on each other, the strength of the terminal section where the TFT substrate only extends is very small.

The terminal section is easy to warp, because its glass plate thickness is very small. Meanwhile, the IC driver is installed in the terminal section. When the glass is warped by an external force, the IC driver is also warped. However, because silicon of which the IC driver is made is not so much warped as glass, there also arises a problem that the IC driver may be broken when an external force is exerted on the terminal section.

In Japanese Published Unexamined Patent Application No. 2005-274632, an arrangement is described such that a front frame having an emboss portion is placed over the IC driver section. This arrangement is to restrain warping of the terminal section and to mechanically protect the IC driver by the emboss portion formed in the front frame.

SUMMARY OF THE INVENTION

The arrangement of Japanese Published Unexamined Patent Application No. 2005-274632 is described such that the front frame made of metal is placed over the terminal section of the TFT substrate and the IC driver is installed within the emboss of this front frame. In this arrangement, if the IC driver and the emboss of the front frame are not aligned with respect to each other, the IC driver and the terminal section of the TFT substrate come to undergo warping at all times. Such a situation would have an adverse effect on the mechanical strength of the terminal section. To prevent this, it is needed to improve the dimensional accuracy of the front frame and improve the accuracy of assembling the front frame and the liquid crystal display panel. To do so increases the parts cost and the manufacturing cost for assembly.

A challenge of the present invention is to effectively realize a module structure of a liquid crystal display panel, a portion of which where the TFT substrate only extends is break-proof under external mechanical pressure, without a substantial increase in the accuracy required for the parts and without a substantial increase in the manufacturing process.

The present invention overcomes the problems as noted above and principal means to do this is to distribute an external pressure in a center portion, on which stress is most likely to concentrate, of the terminal section where the TFT substrate only extends, thus decreasing a maximum stress exerted on the TFT substrate. Specific means are as follows.

There is provided a liquid crystal display device including a liquid crystal display panel that includes: a TFT substrate having a display region where TFTs and pixel electrodes are formed and a terminal section; an opposing substrate over which color filters are formed, the opposing substrate being superposed above the display region; and a liquid crystal layer sandwiched between the TFT substrate and the opposing substrate. The TFT substrate is mounted on a resin mold and the resin mold encloses a light guide plate and a plurality of LEDs arranged in a predetermined direction. These LEDs are separately arranged to face a lateral side of the light guide plate in regions separated by partition walls formed in the resin mold under the terminal section of the TFT substrate. Some of the partition walls of the resin mold formed in a center portion in the predetermined direction are formed in a pair of a first partition wall and a second partition wall. A distance between the centers of the first partition wall and the second partition wall is smaller than a distance between partition walls positioned at either side of one of the LEDs.

Other principal means are as follows. The height of a partition wall of the resin mold formed in the center portion is made lower than that of other partition walls, thereby reducing a maximum stress on the center portion of the terminal section of the TFT substrate. The height of a partition wall of the resin mold formed in the center portion is made lower than other partition walls and a material with a smaller modulus of elasticity than the resin mold is placed between the lower partition wall and the TFT substrate. Alternatively, none of the partition walls is placed in the center portion and a gap between LEDs is filled with a material with a smaller modulus of elasticity than the resin mold.

According to the present invention, it is possible to distribute a stress and reduce a maximum stress in the mechanically weakest terminal section where the TFT substrate only extends in a liquid crystal display device, particularly in the center portion, on which stress is likely to concentrate, of the terminal section. Therefore, it is possible to prevent breakage of the terminal section in the liquid crystal display device.

DETAILED DESCRIPTION OF PREFERRED EMBODIMENTS

Figure 8:
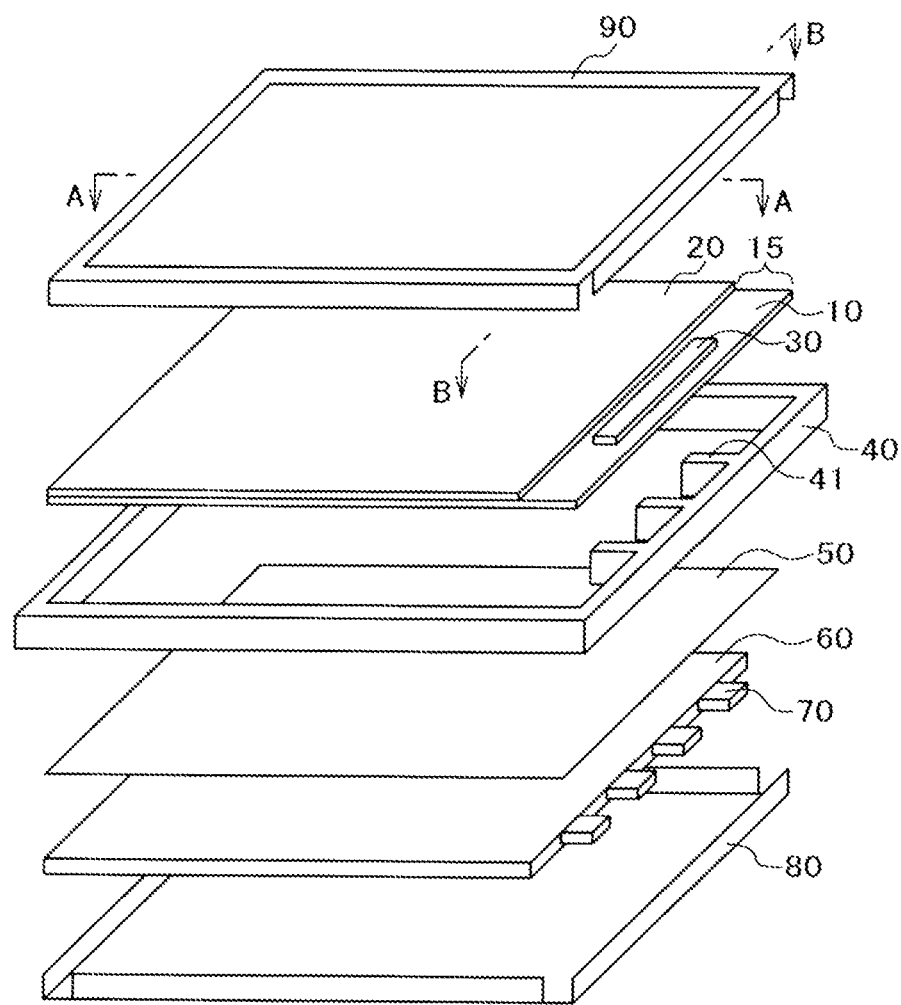
FIG. 8 is an exploded perspective view of a liquid crystal display device.

Prior to describing embodiments of the present invention, descriptions are provided for a liquid crystal display device to which the present invention is applied and external stress against which countermeasures are taken by the present invention. A mechanism for distributing this stress is also described. FIG. 8 is an exploded perspective view of a liquid crystal display device to which the present invention.

In FIG. 8, an opposing substrate 20 is superposed above a TFT substrate 10 and a liquid crystal layer, which is not shown, is sandwiched between the TFT substrate 10 and the opposing substrate 20. An IC driver 30 is installed in a terminal section 15 where the opposing substrate 20 does not extend over the TFT substrate 10 and the TFT substrate 10 only extends. This portion is weakest mechanically, because the TFT substrate 10 is only about 0.2 mm thick. A lower polarizing plate on the underside of the TFT substrate 10 and an upper polarizing plate on the upper surface of the opposing substrate 20 are omitted from FIG. 8. The liquid crystal display panel is formed by the TFT substrate 10 and the opposing substrate 20.

The liquid crystal display panel is mounted on a resin mold 40 under it. The resin mold 40 provides a mount for the liquid crystal display panel as well as accommodates a backlight. In FIG. 8, the backlight is formed of LEDs 70 (Light Emitting Diodes) as a light source, a light guide plate 60, and an optical sheet 50 placed to overly the light guide plate 60.

Although only one optical sheet 50 is depicted in FIG. 8, a set of more than one optical sheet may often be placed. As the optical sheet 50, a diffusion sheet for homogenization of light beams from the light guide plate 60, a prism sheet for effectively directing light beams from the light guide plate 60 toward the liquid crystal display panel, or the like may be placed. Under the light guide plate 60, a bottom frame 80 is placed. Although the bottom frame 80 also serves as a reflective sheet in FIG. 8, a reflective sheet may be placed separately from the bottom frame 80.

In FIG. 8, the backlight is a side light type in which four LEDs 70 are arranged on a side wall of the light guide plate 60. In the resin mold 40 shown in FIG. 8, partition walls 41 corresponding to the LEDs 70 are formed to define regions for accommodating the LEDs 70. Although the LEDs 70 appear to be fit in the guide light plate 60 as shown in FIG. 8, they are actually installed on a flexible wiring board or the like which is not however shown in FIG. 8. The LEDs 70 and the light guide plate 60 are situated as close to each other as possible in order to increase the efficiency of light usage.

The thus formed light crystal display panel, backlight, and other components are covered by a top frame 90. As there is a strong demand for making a liquid crystal display device thinner, all parts are formed as thin as possible. For example, the TFT substrate 10 and the opposing substrate 20 are 0.2 mm thick, respectively, the resin mold 40 in which the backlight is accommodated is about 1 mm thick, and the bottom frame 80 and the top frame 90 are about 0.1 mm thick, respectively. Hence, the liquid crystal display device is easy to warp when an external stress is exerted on it and may be broken if warped to a large extent.

Figure 9:
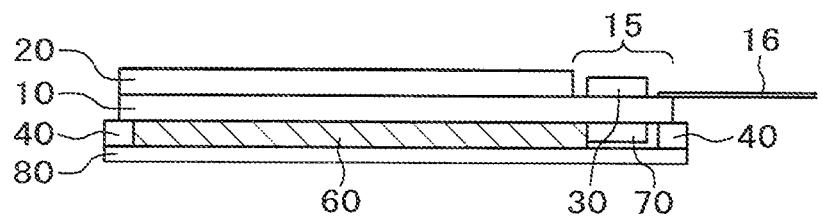
FIG. 9 is a cross-sectional view through line A-A in FIG. 8.
Figure 15:
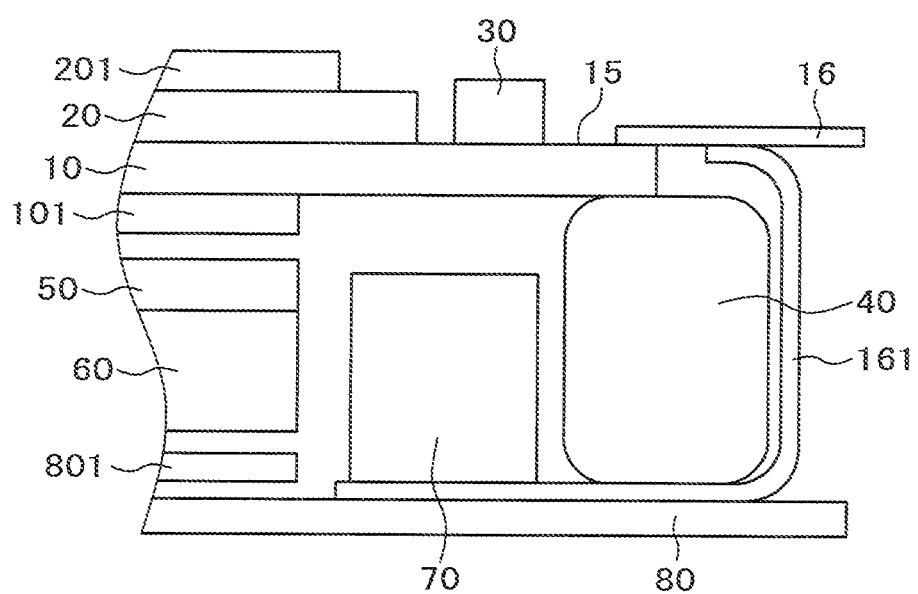
FIG. 15 is an enlarged view of a portion where an LED is disposed in the resin mode.

FIG. 9 is a cross-sectional view of the assembled liquid crystal display device, taken along line A-A in FIG. 8. The top frame 90 is omitted from FIG. 9. In fact, the top frame 90 is not depicted, except in FIG. 8. Further, the lower polarizing plate and the upper polarizing plate are not depicted at all in all figures except for FIG. 15. Although an LED 70, which is a light source, appears to be attached to the TFT substrate 10 as shown in FIG. 9, it is actually installed on a flexible wiring board 161 for the backlight, as is shown in FIG. 15, and inserted into the resin mold from beneath the resin mold 40. FIG. 15 is an enlarged view of a portion where an LED 70 is disposed. The flexible wiring board 161 for the backlight is connected to a flexible wiring board 16 which extends to the TFT substrate 10. Note that a reflective sheet 801, an upper polarizing plate 201, and a lower polarizing plate 101 are depicted in FIG. 15. In FIG. 9, a portion where the opposing substrate 20 is attached to the upper surface of the TFT substrate 10 defines the display region. In the terminal section 15 where the opposing substrate 20 is not attached to the upper surface of the TFT substrate 10 and the TFT substrate 10 only extends, the IC driver 30 is installed. The terminal section 15 is equipped with the flexible wiring board 16 for supplying signals or the like to the liquid crystal display panel.

The light guide plate 60 is placed under the liquid crystal panel and the LEDs 70 are arranged on a lateral side of the light guide plate 60. The light guide plate 60 and LEDs 70 are accommodated in the resin mold 40. The bottom frame 80 which also serves as the reflective sheet is placed under the light guide plate 60. In FIG. 9, the weakest portion under external pressure is the terminal section 15 of the TFT substrate 10.

Figure 10:
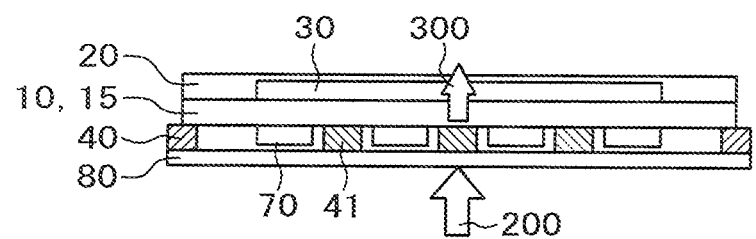
FIG. 10 is a cross-sectional view through line B-B in FIG. 8.

FIG. 10 is a cross-sectional view of the assembled liquid crystal display device, taken along line B-B in FIG. 8. That is, FIG. 10 is a cross-sectional view corresponding to the terminal section 15 of the TFT substrate 10, which is weakest in mechanical strength. In FIG. 10, the liquid crystal display panel comprised of the TFT substrate 10 and the opposing substrate 20 is mounted on the resin mold 40 and the IC driver 30 is installed in the terminal section 15 where the TFT substrate 10 only extends. The LEDs 70 are arranged in gaps between the partition walls 41 of the resin mold 40. There is the bottom frame 80 under the resin mold 40.

Then, if an external pressing load 200 is exerted on the center portion of the terminal section 15, as indicated in FIG. 10, a stress 300 is generated in the terminal section 15 of the TFT substrate 10. If this stress 300 is large, then the terminal section 15 of the TFT substrate 10 is broken. The stress 300 on the terminal section 15 becomes largest when the load is applied to the center portion of the terminal section 15. Therefore, applying a load to the center portion of the terminal section 15 with a columnar pressing jig 100 having a flat or round head and evaluating a resulting stress are practiced.

Figure 11:
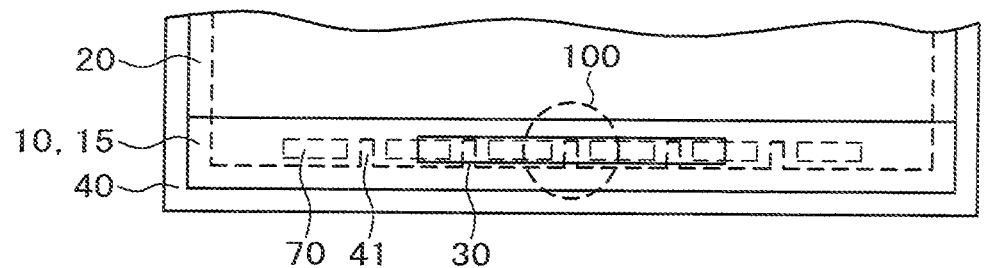
FIG. 11 is a plan view related to an evaluation test for a stress generated in the TFT substrate when a specific resin mold is used.
Figure 12:
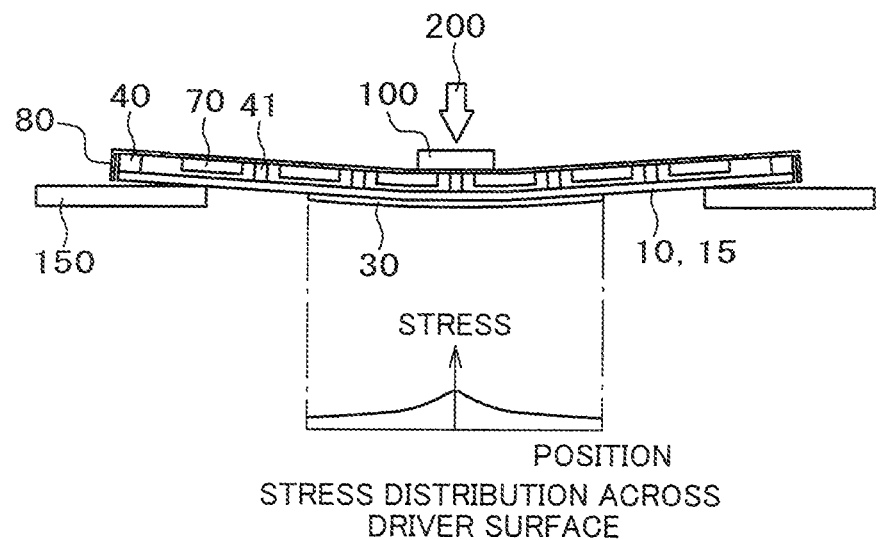
FIG. 12 is a cross-sectional view related to the evaluation test for a stress generated in the TFT substrate when the specific resin mold is used.

FIG. 11 is a plan view related to evaluating a stress on the terminal section 15 of the TFT substrate 10 by this evaluation method. FIG. 12 is a cross-sectional diagram related to this evaluation method. In FIG. 11, the opposing substrate 20 is attached to the upper surface of the TFT substrate 10 and the IC driver 30 is installed in the terminal section 15 when the TFT substrate 10 only extends. The TFT substrate 10 is mounted on the resin mold 40. On the reverse side of the TFT substrate 10, the LEDs 70 are arranged in gaps between the partition walls 41 of the resin mold 40. FIG. 11 depicts a state in which the liquid crystal display device is depressed by the pressing jig 100 having a round cross-section from the reverse side of the LEDs 70 and the bottom frame 80 which is not shown.

FIG. 12 is a cross-sectional view of FIG. 11 and depicts a state in which the bottom frame 80 is depressed by the pressing jig 100 from the reverse side of the liquid crystal display device and thereby the liquid crystal display device warps. That is, the center portion of the terminal section 15 is depressed by the pressing jig 100 with both ends of the liquid crystal display device being mounted on supporting jigs 150. In FIG. 12, a partition wall 41 is present in the center portion of the resin mold 40 and, by depressing this partition wall 41 with the pressing jig 100, the terminal section 15 of the liquid crystal display device becomes warped.

Because the partition wall 41 is a rigid body, a load applied by the pressing jig 100 is directly transmitted to the TFT substrate 10 as a stress exerted on the TFT substrate 10. In FIG. 12, warping takes place and a stress develops in the terminal section 15 of the TFT substrate 10 and the IC driver 30. A stress distribution graph shown in FIG. 12 indicates a state in which an extremely large stress develops in the center portion of the terminal section 15. Therefore, as shown in FIG. 11 or FIG. 12, a structure in which a partition wall 41 of the resin mold 40 is present in the center portion of the terminal section 15 is liable to produce large warping under external stress.

Figure 13:
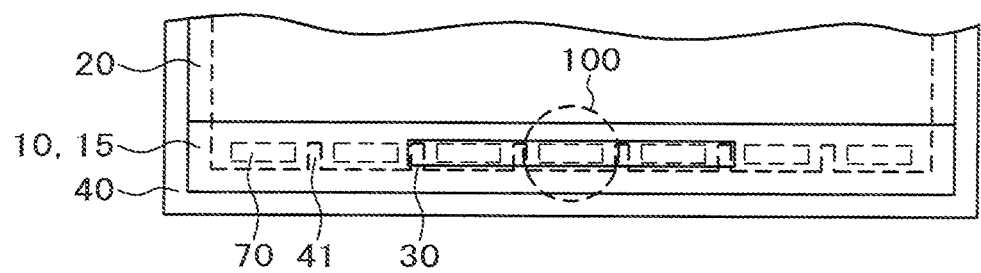
FIG. 13 is a plan view related to an evaluation test for a stress generated in the TFT substrate when another resin mold is used.
Figure 14:
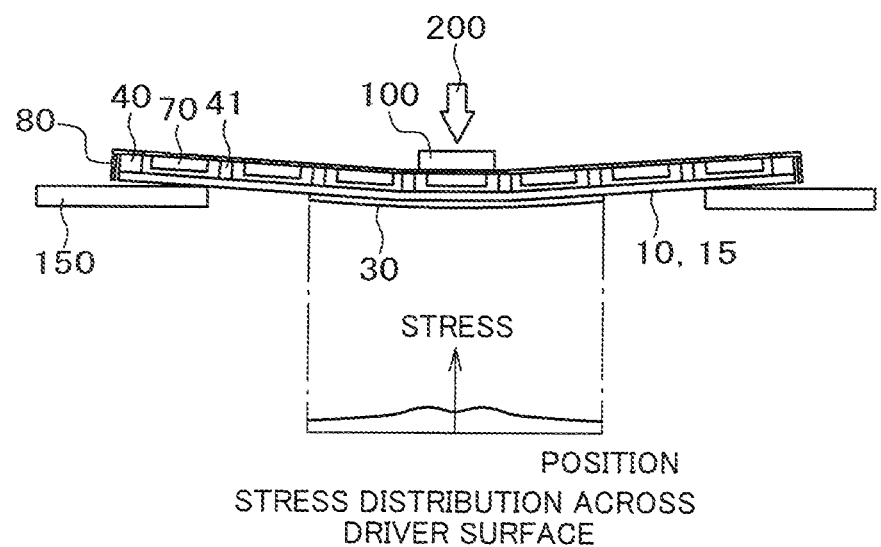
FIG. 14 is a cross-sectional view related to the evaluation test for a stress generated in the TFT substrate when another resin mold is used.

FIG. 13 and FIG. 14 are explanatory diagrams for a case where the evaluation of a stress generated in the TFT substrate 10 shown in FIG. 11 and FIG. 22 is performed for another liquid crystal device. FIG. 13 is a plan view related to evaluating a stress on the terminal section 15 of the TFT substrate 10 by this evaluation method. FIG. 14 is a cross-sectional view related to this evaluation method.

The difference between the liquid crystal display device used in FIG. 11 and FIG. 12 and the liquid crystal display device used in FIG. 13 and FIG. 14 lies in the number of LEDs 70 and the number of partition walls 41 of the resin mold 40 for accommodating the LEDs 70. Because other details of structure are the same as for FIG. 11 and FIG. 12, their explanation is omitted. More specifically, in FIG. 11 and FIG. 12, the number of the LEDs 70 is even, six. Accordingly, one of the partition walls 41 of the resin mold 40 is present in the center portion of the terminal section 15. On the other hand, in FIG. 13 and FIG. 14, the number of the LEDs 70 is odd, seven. Accordingly, one of the partition walls 41 of the resin mold 40 is not present in the center portion of the terminal section 15; instead, one of the LEDs 70 is present in the center portion of the terminal section 15.

In FIG. 14, the distribution of a stress generated in the terminal section 15 of the TFT substrate 10 is shown. When comparing the stress distribution in FIG. 14 and the stress distribution in FIG. 12, it can be seen that the stress in the center portion of the terminal section in FIG. 14 is smaller than that in FIG. 12. Further, in FIG. 14, a large stress portion is distributed. Since the TFT substrate 10 is liable to break in a portion where a maximum stress develops, the structure shown in FIG. 14 is more advantageous than the structure shown in FIG. 12 under external mechanical pressure.

More specifically, in the structure shown in FIG. 12, one of the partition walls 41 of the resin mold 40 is present in the center portion and, therefore, an external pressure of the pressing jig 100 is applied to the terminal section 15 of the TFT substrate 10 such that it concentrates on one point via the central partition wall 41. On the other hand, in the structure shown in FIG. 14, one of the partition walls 41 of the resin mold 40 is not present in the center portion: instead, an LED 70 is present in the center portion of the resin mold 40. Because the height of the LEDs 70 is smaller than the height of the partition walls 41 of the resin mold 40, the LED 70 will not directly press the TFT substrate 10 even when it is depressed by the pressure from the pressing jig 100.

In FIG. 14, the pressure of the pressing jig 100 is to be applied to two partition walls 41 positioned at either side of the central LED 70. This results in distribution of the pressure of the pressing jig 100 between the two partition walls 41. Hence, the pressure exerted by each partition wall 41 in FIG. 14 is smaller than the pressure exerted by one partition wall 41 shown in FIG. 12. In consequence, a maximum stress exerted on the terminal section 15 of the TFT substrate 10 is smaller in the structure of the liquid crystal display device shown in FIG. 14 than in the structure of the liquid crystal display device shown in FIG. 12.

Embodiments of the present invention which will be presented below are based on the present inventors' findings described hereinbefore. In the following embodiments, evaluation of a stress on the terminal section 15 is performed, using the evaluation method described with respect to FIGS. 11 through 14.

First Embodiment

Figure 1:
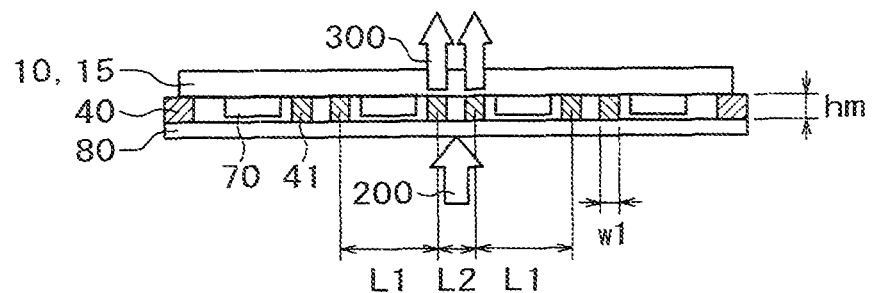
FIG. 1 is a cross-sectional view of a liquid crystal display device of a first embodiment.

FIG. 1 shows a cross-sectional view of the terminal section 15 in a liquid crystal display device according to a first embodiment of the present invention; FIG. 1 corresponds to a cross-sectional view through line B-B in FIG. 8. In FIG. 1, the TFT substrate 10 is mounted on the resin mold 40. Under the resin mold 40, there is the bottom frame 80 which also serves as a reflective sheet. A feature of FIG. 1 lies in that four LEDs 70 are arranged inside the resin mold 40 and two partition walls 41 in a pair are present to separate each LED 70 from its neighboring LED.

By setting up the partition walls 41 in this way, even if an even number of LEDs 70 are arranged with some of the partition walls 41 present in the center portion, as in FIG. 1, two partition walls 41 are present in the center portion. Thus, an external pressing load 200 is distributed between the two partition walls 41. Accordingly, a stress 300 exerted on the TFT substrate 10 can be reduced as compared with the arrangement used heretofore where one partition wall 41 is present in the center portion.

In FIG. 1, given that a distance between the centers of two partition walls 41 positioned at either side of an LED 70 is denoted by L1 and a distance between the centers of two partition walls 41 being present between one LED 70 and another LED 70 is denoted by L2, there is a relation that L1>L2. The width of each partition wall 41 is about 0.3 mm. While the above distance L1 is determined depending on an LED 70 used, the above L2 is about 1.3 mm. The height hm of the resin mold 40 is about 1 mm.

Figure 2:
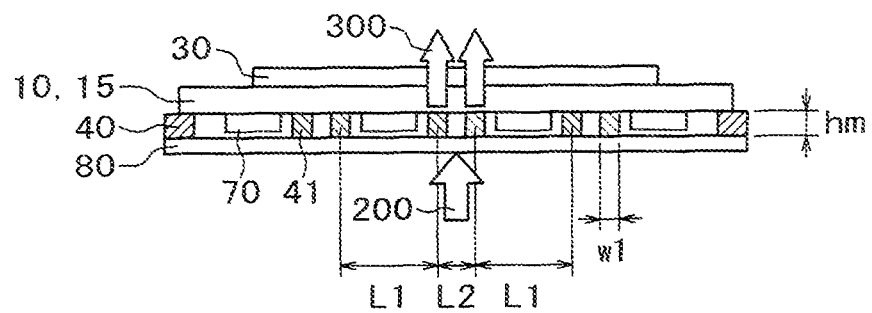
FIG. 2 is another cross-sectional view of the liquid crystal display device of the first embodiment.

FIG. 2 shows a case where the IC driver 30 is installed in the terminal section 15 in the same situation as in FIG. 1. The thickness of the IC driver 30 shown in FIG. 2 is about 0.25 mm. When the pressing load 200 is applied from the bottom frame 80 side, the TFT substrate 10 and the IC driver 30 warp and the largest stress develops in a portion of the outer surface of the IC driver 30. Because the IC driver 30 formed of a Si substrate is more fragile than glass, the largest risk is breakage of the IC driver 30. In the present invention, the stress to develop on the IC driver 30 can be reduced by two partition walls 41 and it is thus possible to decrease the risk of breakage of the IC driver 30.

Figure 3:
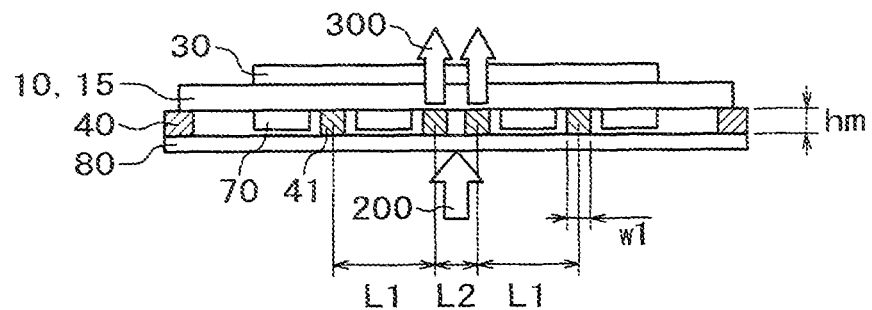
FIG. 3 is a cross-sectional view of a liquid crystal display device according to an alternative example of the first embodiment.

FIG. 3 is an example of modification to this embodiment. In FIG. 3, two partition walls 41 are present in the center portion of the resin mold 40, while a single partition wall 41 is disposed between the LEDs outside of the center portion. Since the stress 300 under external load becomes largest in the center portion, there are two partition walls 41 only in the center portion. Due to a single partition wall 41 disposed in other positions, it is possible to increase the degree of freedom in arranging the LEDs 70.

In FIG. 3, given that a distance between two partition walls 41 positioned in the center portion is denoted by L2 and a distance between partition walls 41 positioned at either side of an LED 70 in other positions is denoted by L1, there is a relation that L1>L2. The width w1 of each partition wall 41 is about 0.3 mm, as is the case in FIG. 1 or FIG. 2. The height hm of the resin mold 40 is about 1 mm.

Second Embodiment

Figure 4:
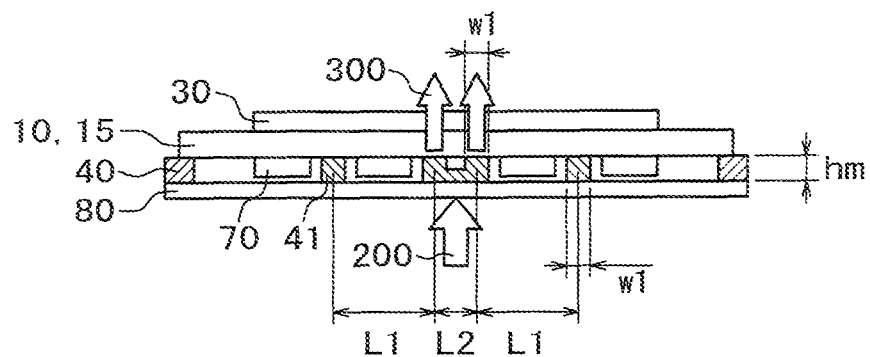
FIG. 4 is a cross-sectional view of a liquid crystal display device of a second embodiment.

FIG. 4 shows a cross-sectional view of the terminal section 15 in a liquid crystal display device according to a second embodiment of the present invention; FIG. 4 corresponds to a cross-sectional view through line B-B in FIG. 8. A structure shown in FIG. 4 is the same as the structure described with respect to FIG. 1 or FIG. 2, except for the partition walls 41 of the resin mold 40. In FIG. 4, a partition wall 41 in the center portion of the resin mold 40 is comprised of a single body part contacting the bottom frame 80 and two separate head parts contacting the TFT substrate 10.

In the structure shown in FIG. 4 as well, due to the two separate head parts of the partition wall 41 contacting the TFT substrate 10 in the center portion of the terminal section 15, the stress 300 exerted on the TFT substrate 10 under external load 200 can be distributed. In the structure shown in FIG. 4, in other words, the partition wall 41 in the center portion is shaped such that a recess is formed in a wider partition wall 41. Thus, this structure has an advantage that the resin mold 40 is easy to manufacture, as compared with the structure of the first embodiment.

In the second embodiment as well, given that a distance between the two separate head parts of the partition wall 41 in the center portion is denoted by L2 and a distance between partition walls 41 positioned at either side of an LED 70 in other positions is denoted by L1, there is a relation that L1>L2. The width of partition walls 41 other than the partition wall in the center portion is about 0.3 mm, again.

Third Embodiment

Figure 5:
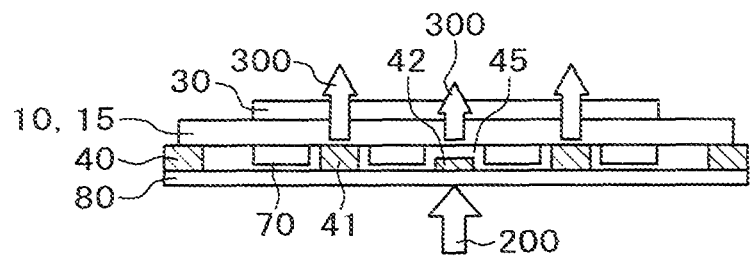
FIG. 5 is a cross-sectional view of a liquid crystal display device of a third embodiment.

FIG. 5 shows a cross-sectional view of the terminal section 15 in a liquid crystal display device according to a third embodiment of the present invention; FIG. 5 corresponds to a cross-sectional view through line B-B in FIG. 8. A structure shown in FIG. 5 is the same as the structure described with respect to FIG. 1 or FIG. 2, except for the partition walls 41 of the resin mold 40. In FIG. 5, a partition wall 42 positioned in the center portion is lower in height than partition walls 41 in other positions. Therefore, there is a clearance 45 between the lower partition wall 42 positioned in the center portion and the TFT substrate 10.

In FIG. 5, when an external pressing load 200 is applied, the resin mold 40 warps, but pressure exerted on the TFT substrate 10 from the resin mold 40 is first transmitted to the TFT substrate 10 through side partition walls 41, not via the lower partition wall 42 in the center portion. Then, when the resin mold 40 has warped to a large extent, the lower partition wall 42 of the resin mold 40 comes in contact with the TFT substrate 10, producing a stress 300 on the TFT substrate 10.

As shown in FIG. 5, some stress 300 that develops in the TFT substrate 10 first develops in the portions of side partition walls 41 at either side of the center portion, not in the center portion. In this way, a large pressure from the resin mold 40 is distributed between the two partition walls 41 in outer positions from the center portion. Accordingly, a maximum stress becomes smaller than the arrangement used heretofore and the risk of breakage of the TFT substrate 10 decreases.

To enhance the effect of the third embodiment, it is preferable that the height of the lower partition wall 42 is four-fifths or less of the height of other partition walls 41. However, the lower partition wall 42 needs to be higher than the height of the LEDs so that the LEDs are not damaged when they are subject to a load. In the third embodiment, the effect can be achieved only by lowering the partition wall 42 positioned in the center portion, as compared with the resin mold 40 in the arrangement used heretofore. Thus, this embodiment entails no increase in the manufacturing cost of the resin mold 40 or no increase in the assembly cost of the liquid crystal display device.

Fourth Embodiment

Figure 6:
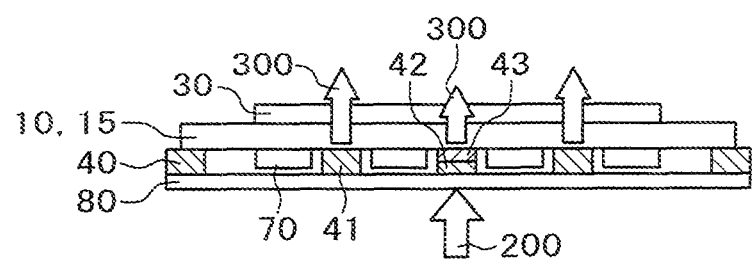
FIG. 6 is a cross-sectional view of a liquid crystal display device of a fourth embodiment.

FIG. 6 shows a cross-sectional view of the terminal section 15 in a liquid crystal display device according to a fourth embodiment of the present invention; FIG. 6 corresponds to a cross-sectional view through line B-B in FIG. 8. A structure shown in FIG. 6 is the same as the structure described with respect to FIG. 1 or FIG. 2, except for the partition walls 41 of the resin mold 40. In FIG. 6, a partition wall 42 positioned in the center portion is lower in height than partition walls 41 in other positions. A material with a low modulus of elasticity, i.e., a deformable material 43 is placed between the lower partition wall 42 in the center portion and the TFT substrate 10. As the deformable material 43, a silicon resin or the like can be used.

In FIG. 6, when an external pressing load 200 is applied, the resin mold 40 warps and a pressure from the resin mold 40 is exerted on the TFT substrate 10 in the center portion. However, a stress 300 that develops in the TFT substrate 10 in the center portion is smaller, because the low modulus body 43 constituting the upper portion of the partition wall 42 in the center portion is easily deformable. In the meantime, when the resin mold 40 warps, some stress 300 on the TFT substrate 10 is produced via partition walls 41 at either side of central two LEDs 70.

Since these two partition walls 41 are rigid bodies and not deformable, the pressing load 200 is applied, distributed between the two partition walls 41. Thus, the pressing load 200 is distributed between two positions and it is thus possible to reduce a maximum stress developing in the TFT substrate 10.

To enhance the effect of the fourth embodiment, it is preferable that the height of the lower partition wall 41 is two-thirds or less of the height of other partition walls 41 and it is preferable that a resin which is the low modulus body 43 is placed to fill the remaining height. This embodiment requires that the low modulus body 43 made of a resin or the like be placed on top of the lower formed partition wall 42 in the center portion of the resin mold 40. However, because two LEDs 70 arranged in the vicinity of the center can be separated completely, this embodiment has an advantage that light distribution in the light guide plate 60 or light distribution of light beams emitted from the light guide plate 60 becomes easy to design.

Fifth Embodiment

Figure 7:
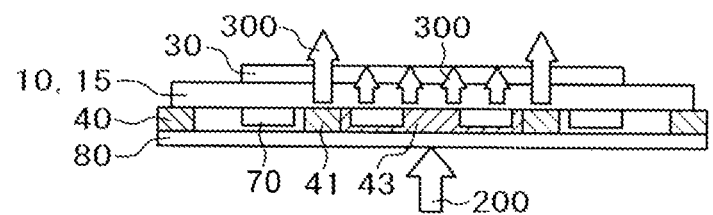
FIG. 7 is a cross-sectional view of a liquid crystal display device of a fifth embodiment.

FIG. 7 shows a cross-sectional view of the terminal section 15 in a liquid crystal display device according to a fifth embodiment of the present invention; FIG. 7 corresponds to a cross-sectional view through line B-B in FIG. 8. A structure shown in FIG. 7 is the same as the structure described with respect to FIG. 1 or FIG. 2, except for the partition walls 41 of the resin mold 40. In FIG. 7, the partition walls 41 of the resin mold 40 are not present in the center portion; instead, the center portion is filled with a low modulus body 43, i.e., a deformable material. As the deformable material 43, a silicon resin or the like can be used.

In FIG. 7, when an external pressing load 200 is applied, the resin mold 40 warps and a pressure from the resin mold 40 is exerted on the TFT substrate 10 in the center portion. In the center portion, however, no partition walls 41 are present, but the low modulus body 43 is only present. A stress 300 that develops in the TFT substrate 10 in the center portion is smaller, because the low modulus body 43 is easily deformable. In the meantime, when the resin mold 40 warps, some stress 300 on the TFT substrate is produced via partition walls 41 at either side of central two LEDs 70.

Since these two partition walls 41 are not very deformable, the pressing load 200 is applied, distributed between the two partition walls 41. Thus, the pressing load 200 is distributed between two positions and it is thus possible to reduce a maximum stress developing in the TFT substrate 10.

A feature of the fifth embodiment lies in that no partition walls 41 are present in the center portion and the center portion is filled with the material of the low modulus body 43, so that the stress 300 that is produced in the vicinity of the center does not concentrate on one point, but is distributed across the region where the low modulus body 43 is present. Thus, the stress on the TFT substrate 10 is further distributed and it is possible to decrease the risk of breakage of the TFT substrate 10.

What is claimed is:

1. A liquid crystal display device comprising a liquid crystal display panel that includes: a TFT substrate having a display region where TFTs and pixel electrodes are formed and a terminal section; an opposing substrate over which color filters are formed; the opposing substrate being superposed above the display region; and a liquid crystal layer sandwiched between the TFT substrate and the opposing substrate, a driver circuit provided on the terminal section,
    wherein the TFT substrate is mounted on a resin mold,
    wherein the resin mold has a light guide plate and a plurality of LEDs arranged in a predetermined direction,
    wherein the plurality of LEDs are separately arranged to face a lateral side of the light guide plate in regions separated by partition walls formed in the resin mold under the terminal section of the TFT substrate,
    wherein some of the partition walls of the resin mold formed in a center portion in the predetermined direction are formed in a pair of a first partition wall and a second partition wall,
    wherein the first partition wall and the second partition wall sustain a center portion of the terminal section,
    wherein the driver circuit, extending in the predetermined direction, is further sustained by a third partition wall, which is adjacent to the first partition wall opposite to the second partition wall from the first partition wall, in addition to the first and second partition walls,
    wherein a distance between the centers of the first partition wall and the second partition wall is smaller than a distance between the first partition wall and the third partition wall, and
    wherein LEDs are not disposed under the display area of the TFT substrate.

2. A liquid crystal display device comprising a liquid crystal display panel that include: a TFT substrate having a display region where TFTs and pixel electrodes are formed and a terminal section; an opposing substrate over which color filters are formed, the opposing substrate being superposed above the display region; and a liquid crystal layer sandwiched between the TFT substrate and the opposing substrate, a driver circuit provided on the terminal section,
    wherein the TFT substrate is mounted on a resin mold,
    wherein an underside of the resin mold is covered by a bottom frame,
    wherein the resin mold has a light guide plate and a plurality of LEDs arranged in a predetermined direction,
    wherein the plurality of LEDs are separately arranged to face a lateral side of the light guide plate in regions separated by partition walls formed in the resin mold under the terminal section of the TFT substrate, wherein one of the partition walls of the resin mold formed in a center portion in the predetermined direction is formed including a single body part contacting the bottom frame and separate head parts providing a pair of a first partition wall and a second partition wall contacting the TFT substrate, wherein the first partition wall and the second partition wall sustain a center portion of the terminal section, wherein the driver circuit, extending in the predetermined direction, is further sustained by a third partition wall, which is adjacent to the first partition wall opposite to the second partition wall from the first partition wall, in addition to the first and second partition walls, wherein a distance between the centers of the first partition wall and the second partition wall is smaller than a distance between the first partition wall and the third partition wall, and wherein LEDs are not disposed under the display area of the TFT substrate.

* * * * *